FABRICATION OF PRECISION ELECTRICAL BRUSHES

Filed Sept. 21, 1967

INVENTORS:
WALTER L. ROCHETTE
THOMAS M. WALKER
BY
ATTORNEY

United States Patent Office 3,488,842
Patented Jan. 13, 1970

3,488,842

FABRICATION OF PRECISION ELECTRICAL BRUSHES

Walter L. Rochette, Glendora, and Thomas M. Walker, Sepulveda, Calif., assignors to Singer-General Precision, Inc., a corporation of Delaware Filed Sept. 21, 1967, Ser. No. 670,024
Int. Cl. H01h *11/00*
U.S. Cl. 29—630 3 Claims

ABSTRACT OF THE DISCLOSURE

A method for the assembly and precise alignment of electrical brushes such as used in shaft position analog-to-digital encoders and other such devices where such alignment becomes critical. In one embodiment a brush, comprised of one or more fine resilient wires united at one end, is bent at several places along its length to provide a spring fit within a tubular metal terminal. An assembly of such terminal-mounted brushes is then installed in an encoder or test fixture and the brushes are manually adjusted within the terminal to their precise position and are then soldered to the terminal after which the wire ends are disunited. The tubular terminal may be formed with a diagonal aperture so that each individual wire of the brush has a slightly different length and vibration frequency to assure constant electrical contact under vibratory environments. In another embodiment a similarly united wire group is fitted into slots in the surface of a printed circuit board brush block assembly, where they may be manually adjusted and soldered at the point of their precise alignment.

BACKGROUND OF THE INVENTION

In most types of apparatus requiring electrical contact brushes the precise alignment of the brushes on a commutator is of no great importance. However, in some types of instruments precise alignment is important and a slight misalignment of a brush may produce appreciable errors. For example, in the brush contact type of analog to digital encoder which comprises a plurality of segmented commutator tracks, each representing a particular digit in a bineary code, a transitional error caused by misalignment of a brush, particularly if associated with a high order digit, will produce errors of great significance. Many ingenious anti-ambiguity systems have been devised to avoid these transitional errors, including the well known V-scan and U-scan brush positioning systems in which the position of a brush is sensed only when it is well clear of a commutator transition point where significant errors due to brush misalignment will occur.

There are certain types of analog-to-digital encoders that are not designed to accommodate anti-ambiguity brush positioning systems. One example would be an encoder utilizing the Gray code commutator configuration; another encoder is that which uses the ICAO altitude code for aircraft transponders. Although both of these types of encoders have been designed so that a transitional error due to brush misalignment will produce a relatively small error, it is apparent that improved accuracy will be obtained if the contact brushes are precisely aligned.

BRIEF DESCRIPTION OF THE INVENTION

The present invention provides a method of fabricating brushes with precise alignment in order to prevent transitional errors because of misalignment in various types of electrical apparatus where such alignment is critical. A brush comprised of a plurality of fine resilient wires is united at one end and is bent at several places along the length to provide a snug, spring fit within the brush terminal. The brush terminal is then mounted in a test fixture or in the apparatus which is to contain it, and the brush assembly is accurately and manually positioned into proper alignment. The brush is then soldered to the terminal and the united end of the resilient wire brush is removed so that each separate resilient wire in the brush may operate separately but in precise alignment with adjacent brushes.

BRIEF DESCRIPTION OF THE DRAWINGS

In the drawings which illustrate preferred embodiments of the invention.

DETAILED DESCRIPTION

Figure 1:
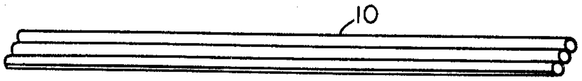
FIGURE 1 is an illustration of three resilient wires which will be formed into an electrical brush.

FIGURES 1–6 illustrate the steps involved in the assembly and alignment of an electrical brush made in accordance with this invention. FIGURE 1 illustrates a group of three fine resilient wires 10 that have been cut to a predetermined length and positioned parallel to and in contact with each other. Wires 10 are made of a spring material such as beryllium copper or other suitable material and are preferably of a circular cross section.

Figure 2:
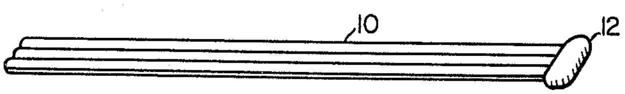
FIGURE 2 is an illustration of the wires of FIGURE 1 after having been united at one end.

As shown in FIGURE 2, resilient wires 10 have been united at one end such as by solder 12.

Figure 3:
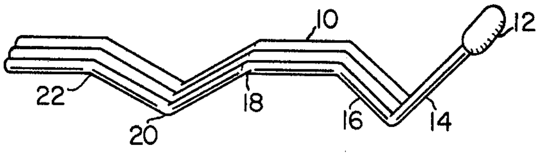
FIGURE 3 is an illustration of the united wires of FIGURE 2 after being provided with a plurality of bends.

FIGURE 3 illustrates the next step, which comprises the forming of the united wires 10. Such forming may be done by a small machine press or, for short run quantities of brushes, the forming may be done manually. As shown in FIGURE 3, resilient wires 10 are provided with an approximate right angle bend 14 near the end united by solder 12. Bend 14 will, in the final device, become the sliding contact for the brush. Additional bends 16, 18, 20 and 22 are made at random along the length of wires 10, so that each of the individual wires is bent at the position and by an amount that is equal to the bend in the adjacent wires. This, of course, is simplified by the existence of solder 12 which unites each of the wires.

Figure 4:
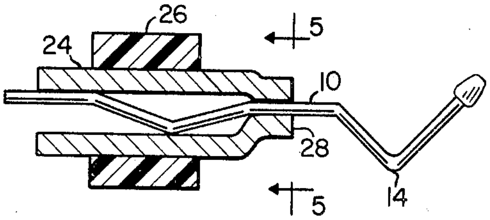
FIGURE 4 is an illustration of the bent brush assembly of FIGURE 3 inserted into a tubular metal terminal.
Figure 5:
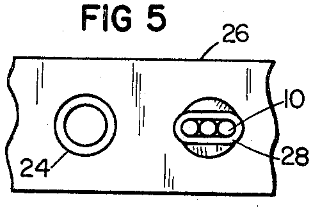
FIGURE 5 is an illustration of the assembly shown in FIGURE 4 and taken along the lines 5—5.

The purpose of the bending of wires 10 at points 18, 20 and 22 is to provide a friction fit within a tubular brush terminal 24 as illustrated in FIGURE 4. As illustrated in FIGURES 4 and 5, brush terminal 24 is comprised of a metallic tubular element affixed to a nonconductive brush block 26. The end of terminal 24, which is to receive the bent wires 10 is squeezed to provide an oval opening 28 having the smaller dimension approximately equal to the diameter of wires 10. The performed wires illustrated in FIGURE 3 are then inserted into the opening 28 of brush terminal 24 where, with a small amount of force, they may be eased into and out of the brush terminal 24 for the purpose of adjustment.

Figures 6, 8:
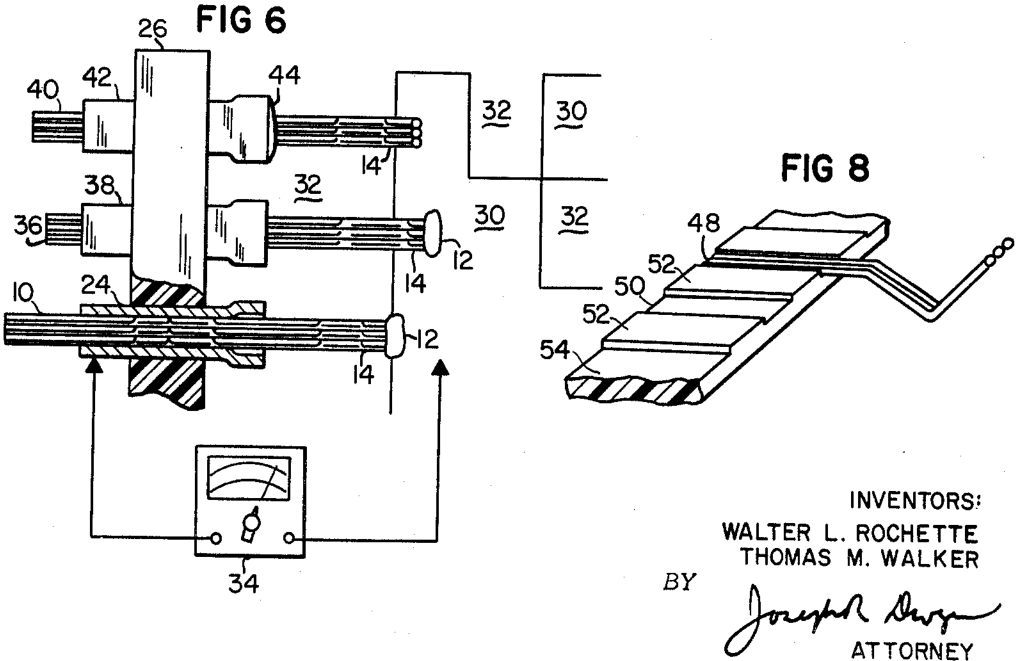
FIGURE 6 is a plan view of a portion of a brush block assembly which illustrates how the brushes may be moved within the tubular terminals.
FIGURE 8 is an illustration of another embodiment in which the brushes are mounted in slots in a printed circuit board.

FIGURE 6 illustrates brush block 26 containing a plurality of terminals, each of which contains a brush composed of a plurality of resilient wires 10. FIGURE 6 illustrates the method by which the precise alignment of the electrical brushes may be made and illustrates a portion of a binary coded member such as is found in a brush type of analog to digital encoder. In the pattern illustrated in FIGURE 6, the coded member comprises a conductive segment 30 formed upon the surface of a nonconductive base 32. This encoder segment is shown for illustrative purposes only since the alignment process may be accomplished with other types of switch elements or within a text fixture, specifically provided for the purpose of aligning the brushes.

The alignment may be accomplished by sliding a brush in or out of the brush terminal 24. An ohmmeter 34, or other similar continuity testing device connected between the conductive segment 30 and the brush terminal 24 may be used to detect the point at which wires 10 contact the conductive segment 30. Thus, with motion between brush block 26 and the encoder pattern restricted, the united wires 10 are adjusted within brush terminal 24 so that the bend 14 in wires 10 just makes contact with the conductive segment 30 of the encoder pattern. In the illustration of FIGURE 6 it is apparent that wires 10 must be moved to the right so that bend 14 will contact segment 30. Similarly, in the adjacent brush, wires 36 must be moved to the left within brush terminal 38 so that bend 14 is over the transition point between conductive segment 30 and the nonconductive base 32 of the encoder pattern. The top brush illustrated in FIGURE 6 shows that bend 14 is directly over this transition point and that the brush wires 40 are properly adjusted within their brush terminal 42. At this point, brushes 40 are permanently affixed to brush terminal 42 by the application of solder 44 to the wires 40 and the terminal 42. After the brush wires have been soldered to terminal 42, the solder 12, which has united all of the wires, is removed by cutting the wires so that each of the separate wires is free to move independently. By such an assembly method, it is apparent that all of the resilient wires are uniformly positioned within a brush terminal and that bend 14 of each individual wire is in precise alignment with the contact bend 14 of adjacent wires.

If the wires in the contact brush are required to operate in conjunction with a commutator, the surface of which is not perfectly smooth, it is possible to vibrate the brush wires at the natural resonant frequency so that there are periods when the brush wires are not making positive contact with the commutator. In order to overcome this difficulty, each individual brush wire should have a different length and a corresponding different natural period of vibration from the adjacent wire.

Figure 7:
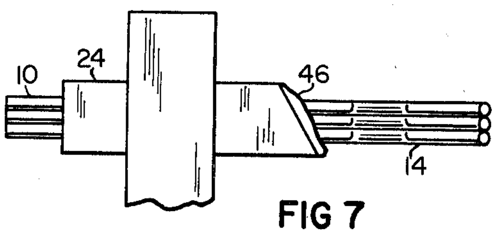
FIGURE 7 is an illustration of another embodiment which illustrates the tubular terminal cut at an angle to provide different resonant vibration frequencies for each individual wire of the brush.

FIGURE 7 illustrates that by forming brush terminal 24 with a diagonal aperture 46, each of the individual wires 10 will have a different effective length and a correspondingly different natural period of vibration.

FIGURE 8 illustrates another embodiment of the invention in which a group of resilient wires 48 having been previously preformed and united at one end, may be positioned in slots 50 between conductive segments 52 of a rigid printed circuit board 54. In this embodiment wires 54 are provided only with the bends required for the sliding contact and the additional bends 18, 20 and 22, illustrated in FIGURE 3 are not required. To assemble a brush according to this embodiment, the united wires are pressed into slots 50 which are of a width corresponding to the width of the united brushes 48. To precisely align the brushes according to this embodiment, it is necessary that a flat tool or fixture be laid across the top of wires 48 to provide suitable friction to retain wires 48 until those wires may be soldered to the conductive segments 52 of the printed circuit board 54. After alignment, the solder that unites the brushes is removed, as discussed in the explanation of FIGURE 6.

What is claimed is:

1. A method for fabricating and aligning a plurality of wires to form an electrical contact brush, said brush comprising the steps of:
- aligning a plurality of individual brush wires in adjacent parallel relationship;
- uniting said plurality of wires at least at one end;
- providing a brush terminal of a tubular electrically conductive material;
- forming a plurality of bends along the length of said united wires, at least one of said bends being formed near one end of said united wires to provide the sliding electrical contact for the completed brush, the remaining bends for providing a friction fit of said united wires within said tubular brush terminal;
- inserting frictionally said remaining bends of said formed united wires into said brush terminal to a point of proper alignment;
- connecting electrically and mechanically said aligned united wires to said brush terminal; and
- disuniting said aligned wires.

2. The method claimed in claim 1, wherein the step of uniting said plurality of wires comprises the soldering together of said plurality at one end.

3. The method claimed in claim 1, wherein said brush terminal is provided with a diagonally formed end whereby each individual wire of said plurality of wires will have a different effective length.

References Cited

UNITED STATES PATENTS

| | | |
|---|---|---|
| 2,760,036 | 8/1956 | Raymer. |
| 3,188,722 | 6/1965 | Lorch. |
| 3,188,407 | 6/1965 | Avgerinos. |

JOHN F. CAMPBELL, Primary Examiner

R. W. CHURCH, Assistant Examiner

U.S. Cl. X.R.

29—418, 423, 622, 628, 629; 174—68.5; 200—11, 166; 310—249, 251; 317—101, 212; 338—202; 339—17, 176, 252